(12) United States Patent
Takemoto

(10) Patent No.: US 7,502,544 B2
(45) Date of Patent: Mar. 10, 2009

(54) RECORDING AND REPRODUCTION APPARATUS

(75) Inventor: Makoto Takemoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 880 days.

(21) Appl. No.: 10/985,979

(22) Filed: Nov. 12, 2004

(65) Prior Publication Data

US 2005/0163480 A1  Jul. 28, 2005

(30) Foreign Application Priority Data

Nov. 14, 2003  (JP) ............... P.2003-384536

(51) Int. Cl.
  *H04N 5/91* (2006.01)
  *H04N 7/00* (2006.01)
(52) U.S. Cl. ................... 386/46; 386/124
(58) Field of Classification Search ........... 348/734; 375/240.25; 386/46, 68, 69; 715/720; 725/100
See application file for complete search history.

(56) References Cited

U.S. PATENT DOCUMENTS 5,911,029 A * 6/1999 Sakaguchi et al. ........... 386/46

2003/0165324 A1 * 9/2003 O'Connor et al. ........... 386/69
2007/0230905 A1 * 10/2007 Kato et al. .................. 386/94

FOREIGN PATENT DOCUMENTS

| JP | 11-273182 A | 10/1999 |
| JP | 2000-333117 A | 11/2000 |
| JP | 2002-112197 | 4/2002 |

* cited by examiner

*Primary Examiner*—Thai Tran
*Assistant Examiner*—Marc Dazenski
(74) *Attorney, Agent, or Firm*—Morgan, Lewis & Bockius LLP

(57) ABSTRACT

Scene change information is included in the header of an I picture, while the data is stored on a hard disk. For a skip search performed during the reproduction of moving picture data, a microcomputer reads the positioning information or the differential information for a scene change, which is correlated with moving picture data at a destination determined by skipping, from a current reproduction location, for a predetermined time. Then, the microcomputer performs the skip search up to the address of reference moving picture data that is obtained based on the positioning information or the differential information. When a user desires to skip a commercial broadcast in a drama, a scene change can be detected between the end of the commercial and the beginning of the continuation of the drama, so that reproduction of the drama is begun at the location of the scene change.

9 Claims, 6 Drawing Sheets

RECORDING AND REPRODUCTION APPARATUS

BACKGROUND OF THE INVENTION

1. Field of the Invention

The present invention relates to a recording and reproduction apparatus that includes: a recording and reproduction control unit, for controlling the recording and reproduction of moving picture data on a recording medium, and for controlling a skip search for a predetermined time; and a scene change detector, for detecting a scene change location for moving picture data received during the recording of moving picture data. More specifically, the present invention relates to a recording and reproduction apparatus that includes not only a conventional skip search mode, but also a special skip search mode that employs a scene change.

2. Description of the Related Art

Conventionally, various techniques for employing a scene change detection function have been proposed for recording and reproduction devices, such as optical disk apparatuses.

For example, a recording and reproduction apparatus had been proposed whereby a reproduction start position for fast reproduction is visually detected and designated, and before operation in a normal reproduction mode is begun, scene change positioning information is employed as means for compensating for a delay time between a user response delay time and an apparatus response delay time, and whereby the reproduction operation is started at a scene change location preceding that at which the user elected to change from the fast reproduction mode to the normal reproduction mode, so that accurate reproduction is enabled (see, for example, JP-A-11-273182).

As another example, a recording and reproduction apparatus is proposed that can rewind or fast forward moving pictures for each scene change, and that reduces the number of operations required to reach a desired scene (see, for example, JP-A-2000-333117).

As is described above, techniques have previously been proposed according to which a scene change detection function is employed to accurately shift from a fast reproduction mode to a normal reproduction mode, and according to which the performance, for each scene change, of a rewind or a fast forward process is simplified. However, currently, no technique has been proposed whereby a scene change detection function is employed for a skip search function, so as to provide not only a conventional skip search function, but also a special skip function.

The skip search function is frequently employed to skip a commercial recorded with a drama, for example, and to continue to view, on a screen, the drama beginning with the scene that normally follows the commercial. In this case, a period extending for a predesignated time, such as fifteen or thirty seconds, one to ten minutes or an hour, is skipped. When the scene reproduced following the skip search is still part of a commercial, the user manipulates a skip search button to again perform the skip search for the predesignated time. Then, when the scene reproduced following this skip search is one from the drama, the user manipulates a rewind and play button to rewind and reproduce a picture while watching a screen, finds a point whereat the switch from the commercial to the drama is effected, and manipulates the play button again. In this case, depending on the timing for the manipulation of the play button, commercials are reproduced for a little time after the reproduction. Therefore, although the user desires to watch the continuation of the drama immediately, the user has to view the commercials for a while before the following story is started. The same thing applies when the skip search function is used to find the next scene in the drama.

As is described above, the conventional skip and search function can quickly move a reproduction location so it is near a position desired by a user. However, to thereafter perform the fine adjustment of the reproduction location requires careful, tedious button manipulation, so that the usability is far from superior.

SUMMARY OF THE INVENTION

To resolve this shortcoming, it is one objective of the present invention to provide a recording and reproduction apparatus that employs a scene change function for a skip search function, so that a reproduction start position desired by a user can be exactly and quickly detected and reproduction begun immediately.

To achieve this objective, according to one aspect of the present invention, a recording and reproduction apparatus includes: a recording and reproduction control unit for controlling the recording and reproduction of moving picture data on a recording medium, and for controlling a skip search for a predetermined time; a scene change detector for detecting scene change locations in moving picture data received while recording moving picture data; and a storage unit for sequentially storing addresses for the scene change locations that are detected by the scene change detector, wherein, when a skip search is to be performed at a reproduction location at the time a skip search instruction is received while moving picture data is being reproduced, the recording and reproduction control unit obtains in advance, through calculation and by skipping for the predetermined time, a destination address, searches for a location address in the storage unit based on the destination address that was obtained, detects a preceding location address nearest the destination address, and executes a special skip search mode for performing a skip search up to the thus detected preceding location address.

As is described above, when the scene change locations detected while recording moving picture data are sequentially stored in the storage unit, and when the skip search mode is performed during reproduction, the preceding location address nearest the destination address for the skip search can be obtained and the skip search can be performed up to the location of this address. Therefore, when a user, for example, desires to skip a commercial running in a drama, a scene change can always be detected between the end of the commercial and the beginning of the continuation of the drama, and the drama can be exactly reproduced beginning at the location of the scene change.

When, as a result of using the special skip search mode, a reproduction start location can always be returned to an address immediately preceding the occurrence of a scene change and the time skipped during the skip search is defined as thirty seconds, for example, and when the time difference between the address for the skip destination and the address for the location immediately preceding the occurrence of the scene change is one minute, the location attained during the special skip search mode precedes the reproduction location by a distance that is equivalent to that covered in thirty seconds. That is, although during the skip search the reproduction location is supposed to be moved forward a distance equivalent to that covered in thirty seconds, the actual location is back of the reproduction location a distance equivalent to that which is covered in thirty seconds. To resolve this problem, according to this invention, when a reproduction time (one minute), which is obtained based on a difference between the address of a skip destination and a preceding address nearest the address of the reproduction location, is greater than the predetermined time (thirty seconds) allocated for a skip search, the recording and reproduction control unit performs the skip search until the address of the destination is attained, by performing a skip search for the predetermined time. That is, in this case, rather than the special skip search, a normal skip search is performed. And as a result, the reproduction start location attained by the skip search can be prevented from being located further back than is necessary.

According to another aspect of the invention, a recording and reproduction apparatus includes: a recording and reproduction control unit for controlling the recording and reproduction of moving picture data relative to a recording medium, and for controlling a skip search for a predetermined time; and a scene change detector for detecting scene changes positions in moving picture data received while recording moving picture data, wherein, while recording the moving picture data, the recording and reproduction control unit records, on the recording medium, positioning information for the scene changes obtained by the scene change detector, in correlation with reference moving picture data (especially for an I picture) that is employed to detect scene changes, and also records, on the recording medium, moving picture data (specifically for an I picture) extending until the next scene change is detected, in correlation with differential information indicating a difference from the reference moving picture data, and wherein, when a skip search is to be performed at a reproduction location, upon the reception of a skip search instruction while moving picture data are being reproduced, the recording and reproduction control unit reads the positioning information for the scene changes, or the differential information that is correlated with the moving picture data at the designation, by skipping from the reproduction position for the predetermined location, and executes a special skip search mode to perform a skip search up to an address for the reference moving picture data that is obtained based on the position or the differential information.

According to this invention, when information for a scene change (position and differential information) is recorded in the header for an I picture, for example, only a comparatively small amount of information is required to record the scene changes. Further, in a skip search performed while moving picture data are being reproduced, the positioning information is read for a scene change or for differential information, which at the destination is correlated with moving picture data by skipping from the reproduction position for the predetermined time. Then, a skip search is performed up to the position address for reference moving picture data that is obtained based on the position or the differential position that has been read. Through this simple process, when a user desires, for example, to skip a commercial in a drama, the scene change is always detected between the end of the commercial and the beginning of the continuation of the drama, so that the reproduction of the drama can be started exactly at the scene change position.

When, as the result of the special skip search mode, the reproduction start position is always returned to the position address whereat the scene change is detected and the skipping time, for example, for the skip search is defined as thirty seconds, and when the time difference between the position address at the skipping destination and the position address whereat the scene change is detected is one minute, the position attained in the special skip search mode is back of the reproduction location a distance equivalent to that covered in thirty seconds. That is, while the reproduction position is supposed to move forward a distance equivalent to that covered in thirty seconds during a skip search, the actual position is back a distance equivalent to that covered in thirty seconds. To resolve this problem, according to this invention, when a reproduction time (one minute), which is obtained based on a difference between the address for moving picture data at a skipping destination and a location address for the reference moving picture data obtained based on the differential information that is correlated with the moving picture data at the skipping destination, is greater than the predetermined time (thirty seconds) for the skip search, the recording and reproduction control unit performs the skip search up to the address for the destination by skipping the predetermined time. That is, in this case, rather than the special skip search, a normal skip search is performed. As a result, the reproduction start position obtained by the skip search can be prevented from being located further back than is necessary.

As another means for resolving the above described problem, during the recording of moving picture data the recording and reproduction control unit clears following differential information when differential information from the reference moving picture data indicates a time longer than a specific time that is shorter than the predetermined time for the skip search. That is, after the specific time has expired, a "0" is recorded as the differential information. Therefore, when a scene change does not occur during the predetermined time allocated for the skip search, a "0" is entered in the I picture at the skip destination as differential information for the scene change. Thus, as in the normal skip search mode, the skip search is performed until the address at the skip destination is reached. That is, the reproduction start location determined following the completion of the skip search can be prevented from being located back than is necessary.

Further, the recording and reproduction control unit may inhibit the execution of the special skip search mode when the predetermined time for the skip search exceeds a predesignated time (e.g., 15 minutes). For example, when commercials are to be skipped, the skip search time is generally comparatively short, such as fifteen or thirty seconds or one minute, and when the skip search time is comparatively long, such as fifteen or thirty minutes, it can be supposed to desire watching of the succeeding scene of the drama., rather than skipping of the commercials. Therefore, in this case, when the normal skip search mode is performed instead of the special skip mode, the reproduction point can be advanced even a little, and a scene desired by a user can be reached more quickly.

In this case, the predesignated time may be set by a user. And then, the skip search mode desired by the user can be selected.

In addition, the recording and reproduction apparatus further includes: a setup unit for permitting a user to designate a scene change detection level. There are various types of movies: some, like home dramas, have comparatively few scene changes; others, like action movies or live concert films, have comparatively many scene changes. Therefore, when a high scene change detection level is set, the unnecessary detection of scene changes can be avoided, and overall, the amount of data for scene changes can be reduced.

In this case, the setup unit may set the scene change detection level by directly entering the consistency between moving picture data immediately before and after a scene change, or by selecting a genre for the moving picture data to be received. For example, when scene changes will probably occur frequently, a consistency of 80% is set by using percentages. Then, when 75% is the consistency of the individual pixels between the moving picture data of frames immediately before and after a scene change, it can be determined that there is no scene change. With this arrangement, the number of times scene changes are detected and the number of addresses required to be stored in the storage unit for scene change locations can be reduced, as can the memory capacity of the storage unit.

Before the percentages are designated, however, a user must determine and designate an optimal scene change detection level in accordance with the moving picture data that is to be recorded. For a user, this is a tedious operation. In order to eliminate this problem, the apparatus may prepare scene change detection levels for individual genres in advance, and a user may merely be required to select a genre to designate a scene change detection level. Specifically, for example, a consistency of 60% for home dramas, a consistency of 70% for sports and a consistency of 80% for action movies and live concert films are prepared in advance by the apparatus. Thus, when a user selects the special skip search mode on a skip search menu screen, the individual genres are displayed on the next setup screen, and when the user then selects the home drama genre, for example, the scene change detection level for the consistency of 60% will be designated. As is described above, the user need merely select a genre, based on the content and images expected to be recorded, for an optimal scene change detection level to be designated.

According to the present invention, the recording and reproduction apparatus further includes: a selector, for permitting a user to select either the special skip search mode or the normal skip search mode, wherein the recording and reproduction control unit may be set to perform the skip search mode designated using the selector. With this arrangement, a user can freely select either skip search mode, in accordance with the purpose for which the skip search is intended.

According to the recording and reproduction apparatus of the invention, the locations of scene changes detected during the recording of moving picture data are stored sequentially in the storage unit, and when a skip search mode is selected during reproduction, a preceding address nearest the address of the destination is detected, and a skip search is performed up to that preceding address. Therefore, for a user who desires to skip commercials, for example, that are broadcast during the course of a drama, since scene changes can be accurately detected between the ends of the commercials and the locations whereat the drama is continued, the reproduction of the drama can be restarted at each scene change location.

Also, according to the recording and reproduction apparatus of the invention, since positioning information for the scene changes and the differential information are recorded, for example, in the header for an I picture, only a comparatively small amount of information is required to record scene changes. Furthermore, since the positioning information for the scene changes or the differential information is correlated with moving picture data at the skip destination, which is located at a distance equivalent to the predetermined time since, from the reproduction location, the skip search process has been performed while the moving picture data were being reproduced, the skip search need only be performed up to the address of the reference moving picture data, which is obtained based on the positioning information or the differential information that has been read. Thus, for a user who skips the commercials that are broadcast in a drama, since a scene change can be accurately detected between the end of a commercial and the continuation of the drama, the reproduction of the drama can be begun at the location of the scene change.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

The preferred embodiments of the present invention will now be described while referring to the accompanying drawings.

Figure 1:
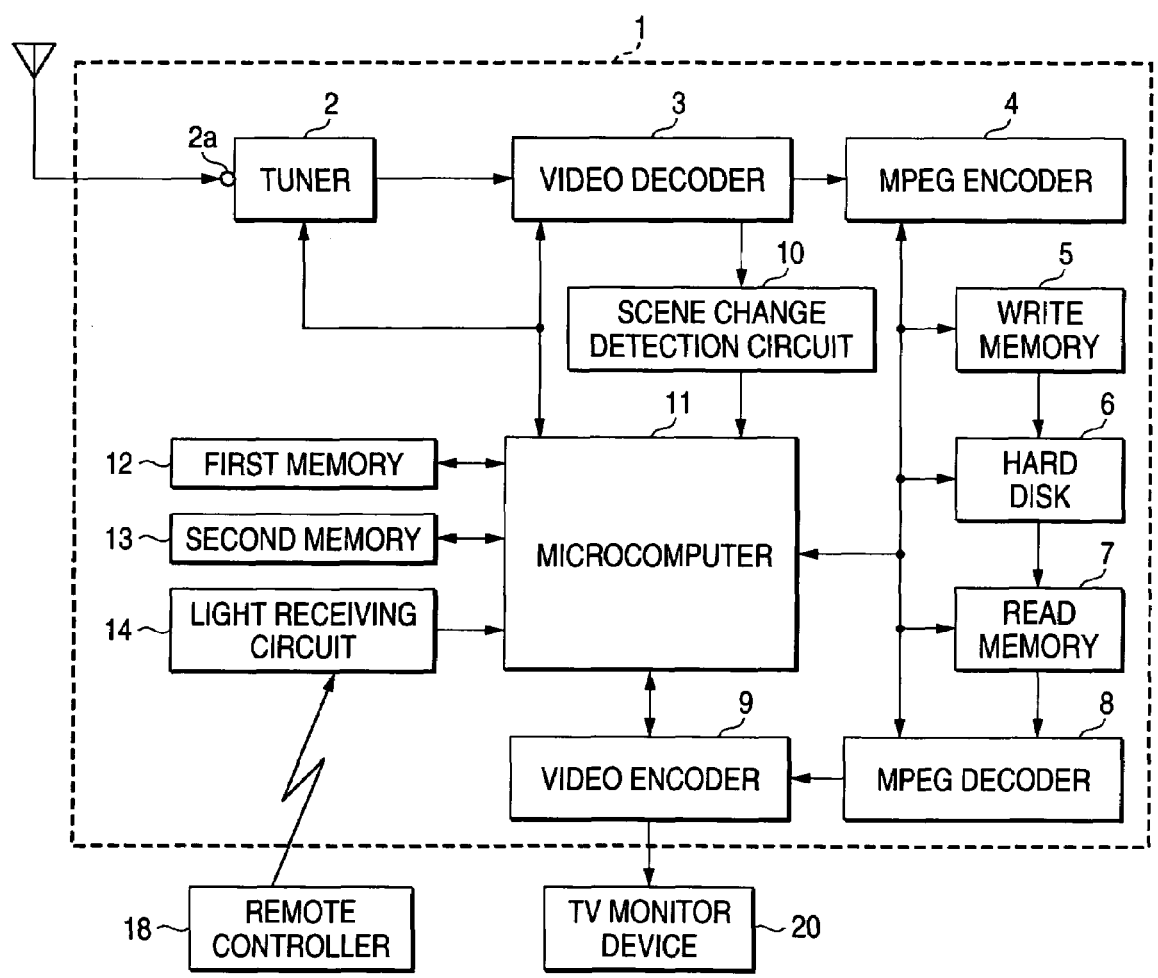
FIG. 1 is a block diagram showing a hard disk apparatus as an example recording and reproduction apparatus according to the present invention.

FIG. 1 is a block diagram showing a hard disk apparatus, which is a recording and reproduction apparatus according to the present invention.

A hard disk apparatus 1 is a recording and reproduction apparatus that stores moving picture and audio digital signals on a hard disk 6, and that reproduces these digital signals and outputs the reproduced data to a TV monitor device (display device) 20, which is externally connected to the apparatus 1.

The hard disk apparatus 1 includes: a tuner (reception unit) 2, for receiving an analog television broadcast signal via an antenna 2a; a video decoder/audio AD (Analog to Digital) converter 3, for converting the analog broadcast signal received by the tuner 2 into a digital moving picture or audio signal; an MPEG encoder 4, for employing the MPEG standards to compress the moving picture or audio signal received from the video decoder/audio AD converter 3; a RAM (Random Access Memory) 5, to which the MPEG data compressed by the MPEG encoder 4 are temporarily written; a hard disk 6, on which the MPEG data written to the RAM 5 are recorded; a RAM (Random Access Memory) 7, in which the MPEG data read from the hard disk 6 are temporarily stored; an MPEG decoder 8, for decoding the MPEG data stored in the RAM 7 to obtain a digital moving picture or audio signal; a video encoder/audio DA (Digital to Analog) converter 9, for converting the digital moving picture or audio signal obtained by the MPEG decoder 8 into an analog moving picture or audio signal and for outputting the moving picture or audio signal to the TV monitor device 20; and a scene change detection means 10, for detecting the location of a scene change in a moving picture based on the signal obtained by the video decoder of the video decoder/audio AD converter 3. The hard disk apparatus 1 further includes: a microcomputer (recording and reproduction control unit) 11, for controlling the individual sections of the apparatus; a first nonvolatile memory 12, in which the operation program for the microcomputer 11 is stored; a second nonvolatile memory 13, in which the addresses for moving picture data at the scene change positions detected by the scene change detection means 10 are sequentially stored; and a light receiving circuit 14, for receiving infrared signals that correspond to various instructions received from a remote controller 18, and for converting the infrared signals into electrical signals and outputting the electrical signals to the microcomputer 11. Since the scene change detection means 10 is provided by employing a well known detection technique, and since various types of detection circuits have previously been proposed, a further detailed explanation will not be given.

When, during reproduction of moving picture data, the microcomputer 11 receives a skip search instruction from the remote controller 18, the microcomputer 11 starts a special skip search mode beginning at a current reproduction location. That is, the microcomputer 11 performs the calculation in advance for the address at a destination obtained by skipping from the reproduction location for a predetermined time, and based on the skip destination, searches for addresses in the second memory 13 to find the preceding address closest to the address at the skip destination. Then, the microcomputer 11 performs a skip search up to the obtained address.

Furthermore, during the recording of moving picture data, the microcomputer 11 records, on the hard disk 6, the positioning information for a scene change detected by the scene change detection means 10, in correlation with reference moving picture data used when the scene change is detected. The microcomputer 11 also records, on the hard disk 6, moving picture data extended until the next scene change is detected, in correlation with differential information indicating a difference from the reference moving picture. Also, when during the reproduction of the moving picture data the microcomputer 11 receives a skip search instruction from the remote controller 18, the microcomputer 11 performs a special skip search beginning at a current reproduction location. That is, the microcomputer 11 reads the scene change positioning information or differential information that is correlated with moving picture data at the destination obtained after skipping from the current reproduction location for the predetermined time, and performs the skip search up to the address of the reference moving picture data that is obtained based on the positioning information or the differential information that has been read.

The program for this skip search of the microcomputer 11 is stored in advance in the first memory 12.

The processing related to a skip search performed by the thus arranged hard disk apparatus 1 will now be explained according to a first embodiment of the present invention.

First Embodiment

In a first embodiment, the addresses of moving picture data at the scene change locations, which are detected by the scene change detection means 10, are sequentially stored in the second memory 13, and the skip search is performed using these addresses.

The skip search mode performed during reproduction will now be described while referring to the flowchart in FIG. 2.

When a skip search instruction is received from the remote controller 18 during the reproduction of moving picture data (when the decision at step S1 is YES), the microcomputer 11 initiates the skip search beginning at the current reproduction location. That is, a calculation is performed in advance to obtain the address of a destination determined by skipping from the current reproduction location for a predetermined time, such as thirty seconds (step S2). The addresses stored in the second memory 13 are examined based on the obtained address at the skip destination, and a preceding address nearest the address of the skip destination is found (step S3). Then, the preceding address is compared with the address of the reproduction location before the skip search was performed (step S4).

When the obtained preceding address indicates a location preceding the address of the reproduction position (when the decision at step S4 is YES), the microcomputer 11 performs the skip search from the reproduction location for the predetermined time (thirty seconds) (step S5), and begins the reproduction at the location obtained by the skip search. That is, when the obtained preceding address precedes the address of the reproduction position before the skip was performed, and when the skip search is performed up to the obtained preceding address, the reproduction point would be determined by moving backward from the reproduction position before the skip was performed. This operation is not intended to be performed by the skip search. Therefore, in this embodiment, to remove this problem, the normal skip search is performed in the above case. However, it should be noted that in this case the skip search may also be performed to move the reproduction start position backward a distance equivalent to an arbitrary time, while the predetermined time of thirty seconds is used as a limit.

When the obtained preceding address is located following the address of the reproduction location (when the decision at step S4 is NO), the microcomputer 11 employs the special skip search mode to perform the skip search up to the obtained preceding address (step S6), and starts the reproduction at the location obtained by the search. For example, when the obtained preceding address is for a location fifteen seconds forward of the reproduction location before the skip was performed, the skip search is performed for fifteen seconds. And when a scene change is detected during this period, it is assumed that, in a case wherein a commercial is skipped, the scene for the commercial may have been switched to a scene for the original reproduced picture (such as a picture for a drama). Thus, the user can again view the continuation of the drama immediately following the commercial.

When the picture reproduced following the 15-second skip search is still for a commercial, the user again depresses the skip search button (not shown) on the remote controller 18. Upon receiving a skip search instruction through this button manipulation (step S7), the microcomputer 11 returns to step S2 and repeats the skip search Second Embodiment In a second embodiment; the position information for scene changes is included in moving picture data, not written in the second memory 13, and all the data are stored on the hard disk 6. During reproduction, a skip and search is performed by reading the scene change location information from the moving picture data. Therefore, the second memory 13 is not required for the second embodiment.

The recording operation will now be described while referring to the flow chart in FIG. 3, and the skip search operation performed during reproduction will be described while referring to the flowchart in FIG. 4.

Recording Operation

In parallel with the recording of moving picture data, the microcomputer 11 constantly monitors the scene change positioning information transmitted by the scene change detection means 10 (step S11). Then, the microcomputer 11 stores on the hard disk 6 the positioning information for scene changes detected by the scene change detection means 10, in correlation with moving picture data (an I picture in this embodiment) that is used as a reference for the detection of a scene change (step S12). In this embodiment, being correlated with means positioning information is written in the header for the I picture. Differential information consisting of a "0" may be written in the header of the I picture that is the reference picture data, or a specific symbol representing reference moving picture data may be so written.

Thereafter, the microcomputer 11 sequentially writes, in the headers of the I pictures for moving picture data extended until the next scene change is detected, the differential information representing a difference from the reference moving picture data (steps S13 and S14). That is, to move picture data located one second later than the reference moving picture data, the differential information "one second" is written in the header of the I picture of the moving picture data.

When the next scene change is detected (when the decision at step S13 is YES), the microcomputer 11 returns to step S12, writes in the header of the I picture, for the reference moving picture data that is used for the detection of the scene change, the positioning information for the scene change detected by the scene change detection means 10, and stores all the data on the hard disk 6.

The microcomputer 11 repeats this processing (steps S12 to S14) until the recording operation has been completed. Thus, the positioning information representing the reference moving picture data, or the differential information representing the difference from the reference moving picture data, is included in the I pictures of the moving picture data that have been recorded.

Reproduction Operation

When a skip search instruction is received from the remote controller 18 during the reproduction of moving picture data (when the decision at step S31 is YES), the microcomputer 11 performs the skip search beginning at the current reproduction location. That is, the microcomputer 11 reads the scene change positioning information or the differential information from the header of the I picture of the moving picture data at the destination determined by skipping from the current reproduction position for a predetermined time, such as thirty seconds (step S32). The microcomputer 11 then employs the positioning information or the differential information to detect the address of the reference moving picture data (an I picture) (step S33). Thereafter, the microcomputer 11 compares the detected address with the address of the moving picture data (an I picture) at the reproduction position before the skip search was performed (step S34).

When the detected address is located before the address of the reproduction position (when the decision at step S34 is YES), the microcomputer 11 performs the skip search from the reproduction location for the predetermined time of thirty seconds (step S35), and initiates reproduction beginning at the obtained position. That is when the detected address preceded the address of the reproduction position before the skip search was performed, and when the skip search was performed up to the detected address, the reproduction start location most be moved backward from the reproduction location before the skip search is performed. It is not intended that this operation be performed by the skip search. Therefore, in this embodiment, to remove this problem, a normal skip search is performed. However, it should be noted that in this case the skip search may also be performed to move the reproduction start position backward for an arbitrary time while employing the predetermined time of thirty seconds as a limit.

When the detected address is located following the address of the reproduction location (when the decision at step S34 is NO), the microcomputer 11 enters the special skip search mode for performing the skip search until the detected address is reached (step S36), and begins reproduction at this address. For example, when the detected address indicates a point fifteen seconds forward of the reproduction position before the skip search was performed, the skip search is performed for fifteen seconds. And when a scene change is found, it is assumed that, in a case wherein a commercial is skipped, a scene for the commercial may have been switched to a scene for the original reproduced picture, such as a scene for a drama. Thus, the user can again view the drama immediately following the commercial.

When the picture reproduced following the 15-second skip search is still for a commercial, the user again depresses the skip search button (not shown) on the remote controller 11. Upon receiving a skip search instruction through this button manipulation (step S37), the microcomputer 11 returns to step S32 and repeats the skip search.

In the second embodiment, the decision at step S4 is made to remove the problem that, when before the skip search was performed the detected address is for a location preceding the address of the reproduction location and the skip search is performed up to the detected address, the reproduction start position must be moved backward, from the reproduction location, before performing the skip search. Another means by which this problem can be removed will now be explained as a third embodiment.

Third Embodiment

According to the third embodiment, the problem described above can be resolved by writing the differential information for scene change in the I picture, instead of making the decision at the time of the skip search.

The recording operation will now be described while referring to the flowchart in FIG. 5.

Recording Operation

Figure 3:
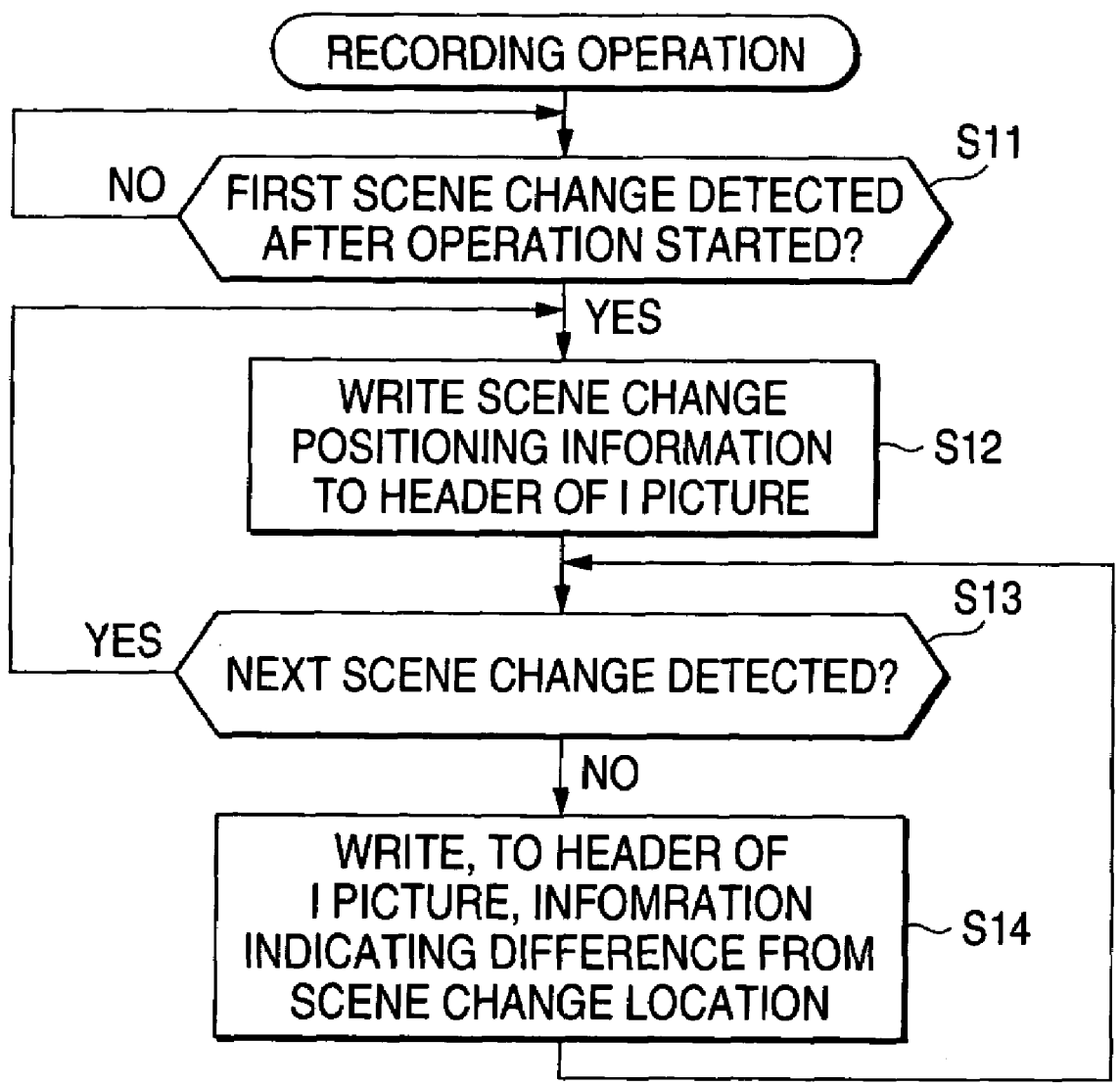
FIG. 3 is a flowchart for explaining the recording operation for a second embodiment.
Figure 5:
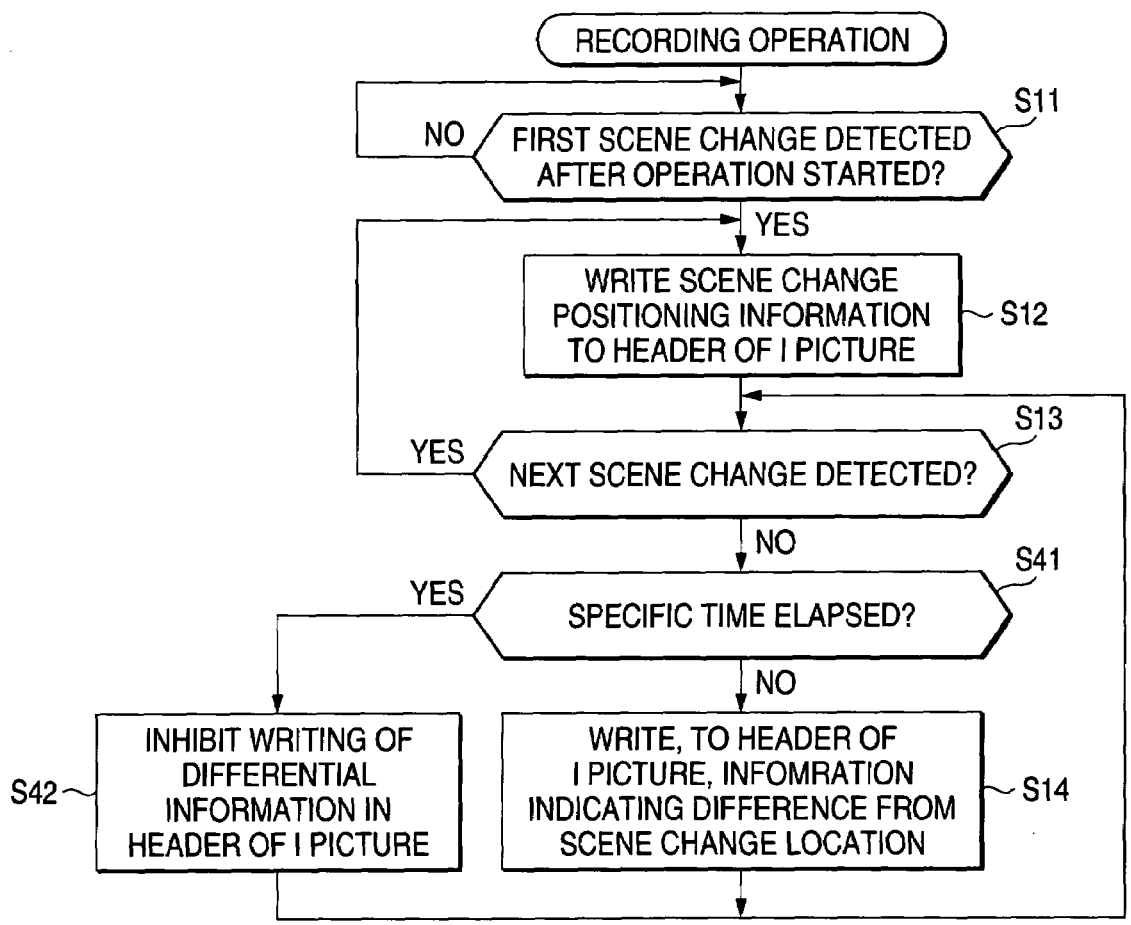
FIG. 5 is a flowchart for explaining the recording operation for a third embodiment.

In the flowchart in FIG. 3, the processes at steps S13 and S14 are performed until the next scene change appears; however, in the third embodiment, these processes are modified as is shown in FIG. 5.

Specifically, a check is performed to determine whether a specific time, such as fifteen seconds, that is shorter than a predetermined skip search time, such as thirty seconds, has elapsed before the detection of the next scene change (step S41). When the specific time has not yet elapsed (when the decision at step S41 is NO), the microcomputer 11 advances to step S14, as in the first embodiment, and sequentially writes in the headers of I pictures, for the moving picture data, differential information representing a difference from reference moving picture data.

When the specific time has elapsed (when the decision at step S41 is YES), the microcomputer 11 clears succeeding differential information and does not correlate the differential information with moving picture data extended until the next scene change is detected, i.e., writes a "0" as the differential information in the headers of the I pictures (step S42).

Through this processing, when a scene change does not appear during a predetermined skip search time, for the differential information for a scene change a "0", is written in the I picture at the skip destination, so that, as in the normal skip search mode, the skip search is performed up to the address of the skip destination. The reproduction operation for the third embodiment is the same as that for the second embodiment.

Fourth Embodiment

According to a fourth embodiment, in addition to the operations performed for the first to third embodiments, when the predetermined skip search time is longer than a predesignated time, such as fifteen minutes, the execution of the special skip search mode is inhibited.

For example, when the skipping of a commercial is desired, the skip search time is generally comparatively short, such as fifteen or thirty seconds or a minute, and when the skip search time is comparatively long, such as fifteen or thirty minutes or an hour, it is probable that viewing of the continuation of a drama is desired, rather than that a commercial be skipped. In this case, the normal skip search mode is performed instead of the special skip search mode. As a result, the reproduction start position can be moved forward even a little, and a scene desired by a user can be reached quickly.

The predesignated time may be selected by the user.

Figure 6:
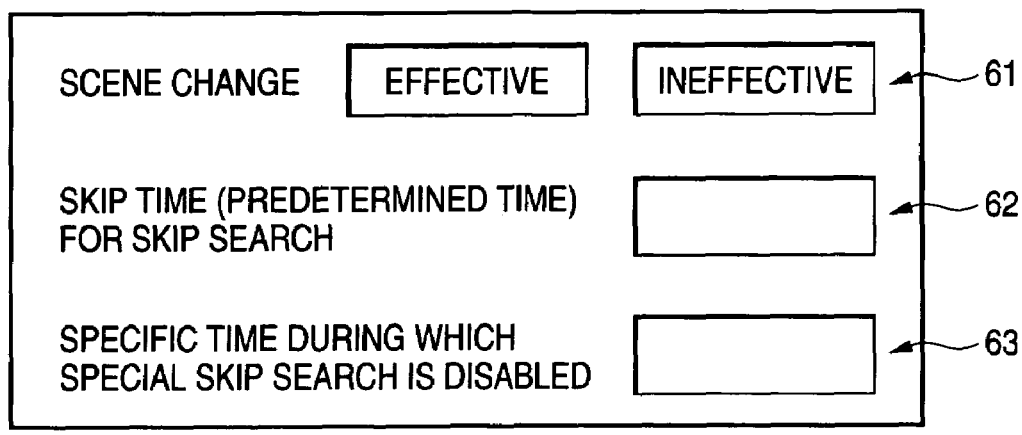
FIG. 6 is a diagram for explaining an example skip search menu screen.

For example, when the user manipulates the skip search menu button (not shown) on the remote controller 18, a skip search menu screen shown in FIG. 6 is displayed on the TV monitor device 20.

The skip search menu screen will now be explained. On the skip search menu screen, selection boxes 61 are provided to determine whether a scene change should be effective or ineffective. When "effective" is selected, the processing as described in the first to third embodiment is performed. When "ineffective" is selected, the normal skip search is performed.

On the skip search menu screen, a setup box 62 is also provided to enter a predetermined skip time for a skip search. Fifteen seconds, thirty seconds, a minute, fifteen minutes, thirty minutes and an hour are prepared as the skip times, and the user can select a desired skip time from among them. When a skip time is not entered in the setup box 62, a default time, such as fifteen seconds, is designated.

Further, on the skip search menu screen, a setup box 63 is provided for entering a specific time during which the special skip search is disabled.

In the fourth embodiment, the specific time is designated in the setup box 63. That is, the user enters a desired specific time by manipulating numerical buttons (not shown) on the remote controller 18, and establishes the specific time by manipulating the register button (not shown) on the remote controller 18. As a result, a skip search mode can be set up that matches the desire of the user. That is, for a skip search performed during a short skip time (shorter than the specific time), the special skip search mode is enabled, and for a skip search performed during a long skip time (the specific time or longer), the special skip search mode is disabled and only the normal skip search mode is enabled.

Fifth Embodiment

According to a fifth embodiment, a setup unit that permits a user to designate a scene change detection level is further included.

For example, there are various types of movies: movies having comparatively few scene changes, such as home dramas, and movies having comparatively many scene changes, such as action movies and live concert films. To record movies or live concert films wherein scene changes seem to appear frequently, only the scene change detection level need be increased, so that the unnecessary detection of scene changes can be eliminated, and overall, the amount of data required for scene changes can be reduced. This is especially effective for the first embodiment wherein the addresses of scene changes are sequentially stored in the second memory 13.

In this case, the setup unit is the remote controller 18, and there are two methods available for setting a scene change detection level: a method for directly entering the consistency between moving picture data immediately before and after a scene change is detected, and a method for selecting a genre for moving picture data to be received.

Figure 7:
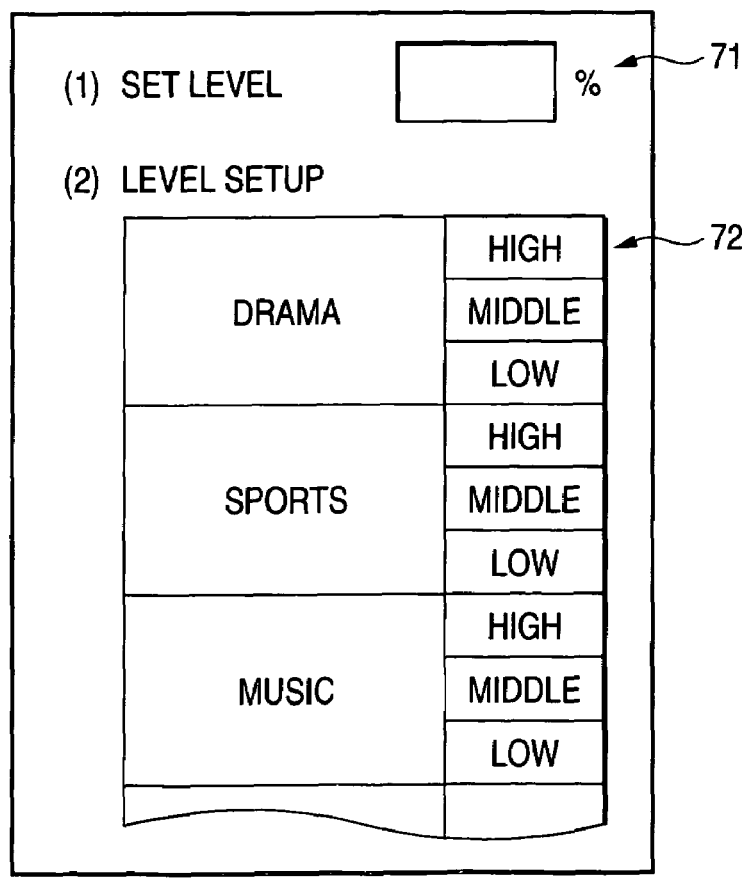
FIG. 7 is a diagram for explaining an example scene change detection level setup screen when a scene change is determined to be effective.

When, for example, the user manipulates the skip search menu button (not shown) on the remote controller 18, the skip search menu screen in FIG. 6 is displayed on the TV monitor device 20, and when the user selects the selection box 61 "effective", a scene change detection level setup screen in FIG. 7 is displayed.

On the upper portion of the setup screen, a setup box 71 is provided for directly entering a numerical value for the consistency between moving picture data immediately before and after a scene change. The user enters the consistency (e.g., 80%) in the setup box 71 by manipulating numerical buttons (not shown) on the remote controller 18, and establishes the scene change detection level of 80% by manipulating the register button (not shown) on the remote controller 18.

On the lower portion of the screen, a setup column 72 is provided for selecting a genre to designate the scene change detection level. In this case, the apparatus prepares in advance the scene change detection levels for the individual genres, and when the user arbitrarily selects a genre, a scene change detection level that corresponds to the selected genre can be designated. An optimal number of genres, such as dramas, sports and music, are prepared while taking into account the situations wherein a scene change will appear. In this embodiment, the scene change detection level for each genre is further divided into high, middle and low, so that the detection level can be selected more in detail. For example, when the standard detection level for a drama is 60%, and when "high" for this genre is selected, a detection level of 65% is set, when "middle" is selected, the standard detection level of 60% is set, and when "low" is selected, a detection level of 55% is set. This also applies for the other genres.

As is described above, when a user selects a genre in accordance with the image expected to be recorded as the contents, the optimal scene change detection level can be designated.

According to the present invention, when the special skip search is performed, reproduction is begun at the location detected for a scene change. However, reproduction may be started slightly before the scene change detection location. That is, after a commercial has been skipped using the skip search, at the end of the commercial, about one second of the reproduction preceding the end of the commercial may be reproduced at the beginning of the subsequent reproduction. This is more acceptable by a user because the user can visually confirm that the reproduced drama is continued from the scene shown before the commercial.

[FIG. 1]

2: TUNER
3: VIDEO DECODER/AUDIO AD CONVERTER
4: MPEG ENCODER
5: RAM
6: HARD DISK
7: RAM
8: MPEG DECODER
9: VIDEO ENCODER/AUDIO DA CONVERTER

10: SCENE CHANGE DETECTION MEANS
11: MICROCOMPUTER
12: FIRST MEMORY
13: SECOND MEMORY
14: LIGHT RECEIVING CIRCUIT
18: REMOTE CONTROLLER
20: TV MONITOR DEVICE

Figure 2:
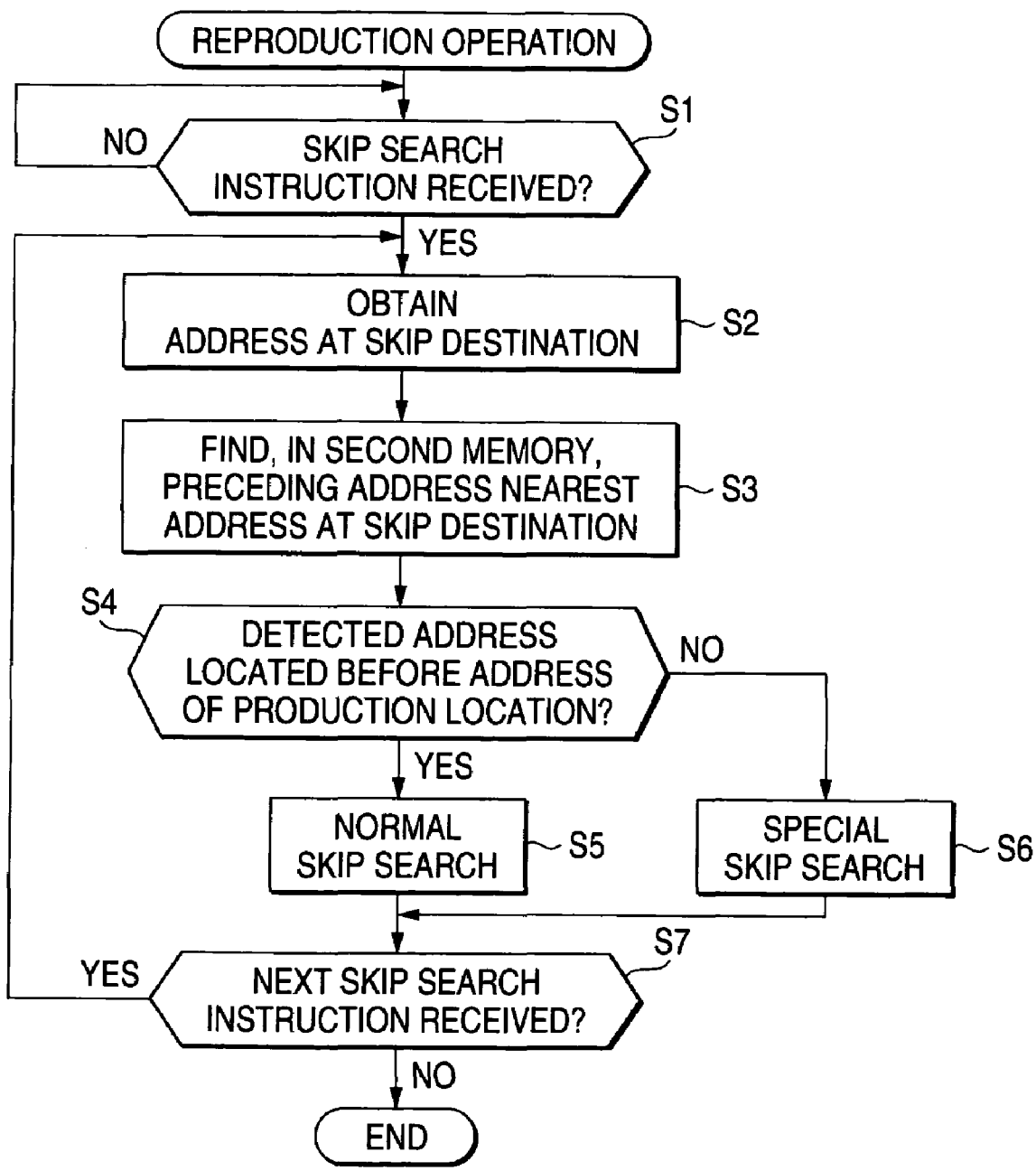
FIG. 2 is a flowchart for explaining the skip search operation for a first embodiment.

[FIG. 2]
S1: SKIP SEARCH INSTRUCTION RECEIVED?
S2: OBTAIN ADDRESS AT SKIP DESTINATION.
S3: FIND, IN SECOND MEMORY, PRECEDING ADDRESS NEAREST ADDRESS AT SKIP DESTINATION.
S4: OBTAINED ADDRESS LOCATED BEFORE ADDRESS OF REPRODUCTION LOCATION?
S5: NORMAL SKIP SEARCH.
S6: SPECIAL SKIP SEARCH.
S7: NEXT SKIP SEARCH INSTRUCTION RECEIVED?

[FIG. 3]
S11: FIRST SCENE CHANGE DETECTED AFTER OPERATION STARTED?
S12: WRITE SCENE CHANGE POSITIONING INFORMATION TO HEADER OF I PICTURE.
S13: NEXT SCENE CHANGE DETECTED?
S14: WRITE, TO HEADER OF I PICTURE, INFORMATION INDICATING DIFFERENCE FROM SCENE CHANGE LOCATION.

Figure 4:
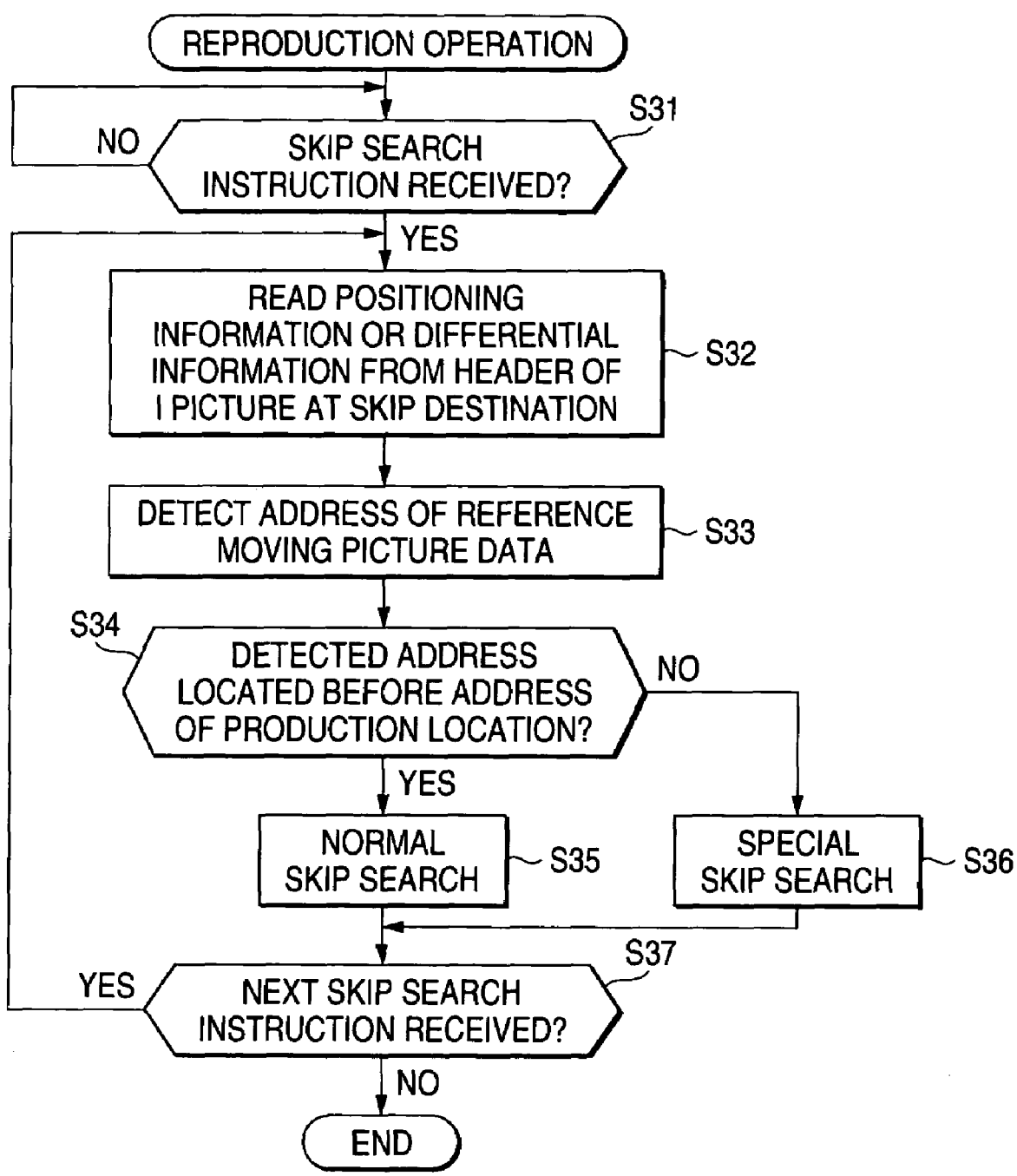
FIG. 4 is a flowchart for explaining the skip search operation for the second embodiment.

[FIG. 4]
S31: SKIP SEARCH INSTRUCTION RECEIVED?
S32: READ POSITIONING INFORMATION OR DIFFERENTIAL INFORMATION FROM HEADER OF I PICTURE AT SKIP DESTINATION.
S33: DETECT ADDRESS OF REFERENCE MOVING PICTURE DATA.
S34: DETECTED ADDRESS LOCATED BEFORE ADDRESS OF REPRODUCTION LOCATION.
S35: NORMAL SKIP SEARCH.
S36: SPECIAL SKIP SEARCH.
S37: NEXT SKIP SEARCH INSTRUCTION RECEIVED?

[FIG. 5]
S11: FIRST SCENE CHANGE DETECTED AFTER OPERATION BEGUN?
S12: WRITE SCENE CHANGE POSITIONING INFORMATION IN HEADER FOR I PICTURE.
S13: NEXT SCENE CHANGE DETECTED?
S14: WRITE, IN HEADER OF I PICTURE, INFORMATION INDICATING DIFFERENCE FROM SCENE CHANGE LOCATION.
S41: SPECIFIC TIME ELAPSED?
S42: INHIBIT WRITING OF DIFFERENTIAL INFORMATION IN HEADER OF I PICTURE.

[FIG. 6]
61: SCENE CHANGE
62: SKIP TIME (PREDETERMINED TIME) FOR SKIP SEARCH
63: SPECIFIC TIME DURING WHICH SPECIAL SKIP SEARCH IS DISABLED

What is claimed is:

1. A recording and reproduction apparatus, comprising:
a recording and reproduction control unit, for controlling the recording and reproduction of moving picture data on a recording medium, and for controlling a skip search for a predetermined time;
a scene change detector for detecting a scene change location in data received while recording moving picture data; and
a selection unit employed by a user to change to a special skip search mode and to a normal skip search mode, wherein:
while motion picture data is being recorded, the recording and reproduction control unit records, on the recording medium, information for a scene change location obtained by the scene change detector, in correlation with an I picture of reference moving picture data that is a reference at the time a scene change is detected;
for moving picture data for which differential information indicating a difference from the reference moving picture data does not exceed a specific time, which is shorter than the predetermined time for the skip search, the recording and reproduction control unit records an I picture for the moving picture data on the recording medium, in correlation with the differential information;
when the differential information indicating a difference from the reference moving picture data exceeds the specific time, which is shorter than the predetermined time for the skip search, the recording and reproduction unit clears the differential information to be correlated with the moving picture data until the next scene change is detected; and
when the special skip search mode is selected by the selection unit, and when a skip search is started at a reproduction position upon receiving a skip search instruction during the reproduction of moving picture data, the recording and reproduction control unit reads, from the reproduction position, scene change location information, or differential information, that is correlated with an I picture at a destination reached by skipping for a predetermined time, and executes the special skip search mode to perform a skip search up to a location address for the reference moving picture data that is obtained based on the scene change positioning information or the differential information that has been read.

2. A recording and reproduction apparatus, comprising:
a recording and reproduction control unit for controlling the recording and reproduction of moving picture data relative to a recording medium, and for controlling a skip search for a predetermined time; and
a scene change detector for detecting scene changes positions in moving picture data received while recording moving picture data, wherein:
while recording the moving picture data, the recording and reproduction control unit records, on the recording medium, positioning information for the scene changes obtained by the scene change detector, in correlation with reference moving picture data that is employed to detect scene changes, and also records, on the recording medium, moving picture data extending until the next scene change is detected, in correlation with differential information indicating a difference from the reference moving picture data; and
when a skip search is to be performed at a reproduction location, upon the reception of a skip search instruction while moving picture data are being reproduced, the recording and reproduction control unit reads the positioning information for the scene changes, or the differential information that is correlated with the moving picture data at the designation, by skipping from the reproduction position for the predetermined location, and executes a special skip search mode to perform a skip search up to an address for the reference moving picture data that is obtained based on the position or the differential information, wherein during the recording of moving picture data, the recording and the reproduction control unit clears following differential information when differential information from the reference moving picture data indicates a time longer than a specific time that is shorter than the predetermined time for the skip search.

3. The recording and reproduction apparatus according to claim 2, wherein
the reference moving picture data and moving picture data with which the differential information is to be correlated are I pictures.

4. The recording and reproduction apparatus according to claim 2, wherein
when a reproduction time, which is obtained based on a difference between the address for moving picture data at a skipping destination and a location address for the reference moving picture data obtained based on the differential information that is correlated with the moving picture data at the skipping destination, is greater than the predetermined time for the skip search, the recording and reproduction control unit performs the skip search up to the address for the destination by skipping the predetermined time.

5. The recording and reproduction apparatus according to claim 2, wherein
the predesignated time is set by a user.

6. The recording and reproduction apparatus according to claim 5, wherein
the setup unit sets the scene change detection level by directly entering the consistency between moving picture data immediately before and after a scene change, or by selecting a genre for the moving picture data to be received.

7. The recording and reproduction apparatus according to claim 2, further comprising:
a selector, for permitting a user, to select either the special skip search mode or the normal skip search mode, wherein
the recording and reproduction control unit may be set to perform the skip search mode designated using the selector.

8. The recording and reproduction apparatus according to claim 2, wherein
the recording and reproduction control unit inhibits the execution of the special skip search mode when the predetermined time for the skip search exceeds a pre-designated time.

9. The recording and reproduction apparatus according to claim 2, further comprising:
a setup unit for permitting a user to designate a scene change detection level.

* * * * *